June 13, 1967  A. L. LOTTS ET AL  3,324,540

METHOD FOR MAKING POROUS TARGET PELLETS FOR A NUCLEAR REACTOR

Filed June 17, 1963  2 Sheets-Sheet 1

INVENTORS.
Adolphus L. Lotts
BY  Eugene E. Barton, Jr.

ATTORNEY.

United States Patent Office 3,324,540
Patented June 13, 1967

3,324,540
METHOD FOR MAKING POROUS TARGET
PELLETS FOR A NUCLEAR REACTOR
Adolphus L. Lotts, Knoxville, and Eugene E. Barton, Jr., Oak Ridge, Tenn., assignors to the United States of America as represented by the United States Atomic Energy Commission
Filed June 17, 1963, Ser. No. 288,574
3 Claims. (Cl. 29—420.5)

Our invention relates to target pellets for nuclear reactors and more particularly to target pellets for the irradiation of actinide elements in nuclear reactors and a method for making these pellets.

It is well known that small quantities of isotopes of transuranium elements may be produced by irradiation of various isotopes of the actinide elements in elemental or compound form. Actinide elements or compounds to be irradiated will be referred to herein as "target materials." For example, isotopes of curium, berkelium, californium, einsteinium and fermium will result from irradiation, in a high flux nuclear reactor, of plutonium-242 and a mixture of americium-242 with curium-244.

The actinide elements may be transmuted at the highest possible rate in a high flux reactor of the type disclosed in the copending application of the common assignee, Ser. No. 82,141, filed Jan. 11, 1961, in the name of Richard D. Cheverton for "Gradient Fuel Plates,'" now U.S. Patent No. 3,175,955, issued Mar. 30, 1965. That application shows a "flux trap" reactor utilizing involute fuel plates arranged to form an annular fuel region. This annular fuel region defines a central channel which serves as a receptacle for actinide target materials used in the production of transuranium isotopes.

Actinide target materials are placed in the central channel of the reactor in containers called "capsules" or "pellets" disposed in a finned cylindrical tube referred to in the art as a "target rod."

Since actinide target materials and transuranium elements produced by transmutation present an extreme radiological hazard, a means of containment must be provided to prevent spillage and cross contamination of these highly radioactive materials. In addition, while containing the transuranium elements in the form of solids, means must be provided for the escape of fission gases generated as a result of irradiation of the target materials. In the past, irradiation capsules or pellets have been fabricated from cylindrical metal cups having one end closed. After filling these cups with powdered actinide target materials, the top is crimped sufficiently to prevent loss of the actinide powder while at the same time leaving a minute opening to allow fission gases to escape. This method, which requires three separate pressing operations for the preparation of each pellet, does not give good assurance of preventing fine powder losses and gases do not escape as rapidly as is necessary. Also it has been found that the closed end of cylindrical cups exhibited undue stress concentrations as a result of pressing the actinide powder into the cups.

It is therefore, an object of our invention to provide an improved method of making a porous nuclear reactor target pellet.

This and other objects and advantages of our invention will become apparent from the following detailed specification and claims which are hereinafter set forth, taken in conjunction with the accompanying drawings in which:

In accordance with our invention we have provided a new method of fabricating a porous nuclear reactor target pellet. A tubular metallic member is placed in a suitable die and the lower portion of the member charged with a first metal powder. A metal powder dispersant containing an actinide oxide powder is placed within said member on top of the first metal powder. The upper portion of the tubular member is then charged with a third metal powder. The tubular member and the metal powders are simultaneously pressed to form a composite porous metal compact, the ends of said compact forming porous metallic end closures for the tubular metallic member.

The target pellet is thus fabricated by a single pressing with porous end closures formed in situ from metal powder. These pellet end closures provide a containment means for the solid actinide oxide and solid fission products formed upon irradiation, while at the same time, fission gases are permitted to escape through both ends of the pellets. Further, undue stress concentrations in the ends of the pellets are essentially eliminated.

Figure 1:
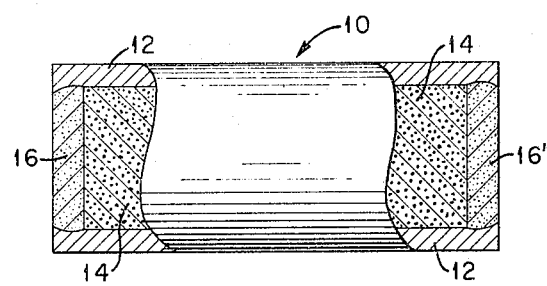
FIG. 1 shows an enlarged transverse section of a cylindrical nuclear reactor target pellet made in accordance with our invention.

Referring now to FIG. 1, the target pellet 10 comprises a tubular metallic member 12 having a central cavity for the retention of a compressed metal powder mixture 14 containing an actinide oxide in a metal powder dispersant. The ends of tubular member 12 are provided with porous metallic end closures 16, 16' to contain the metal powder mixture 12 in the central cavity.

Figure 4:
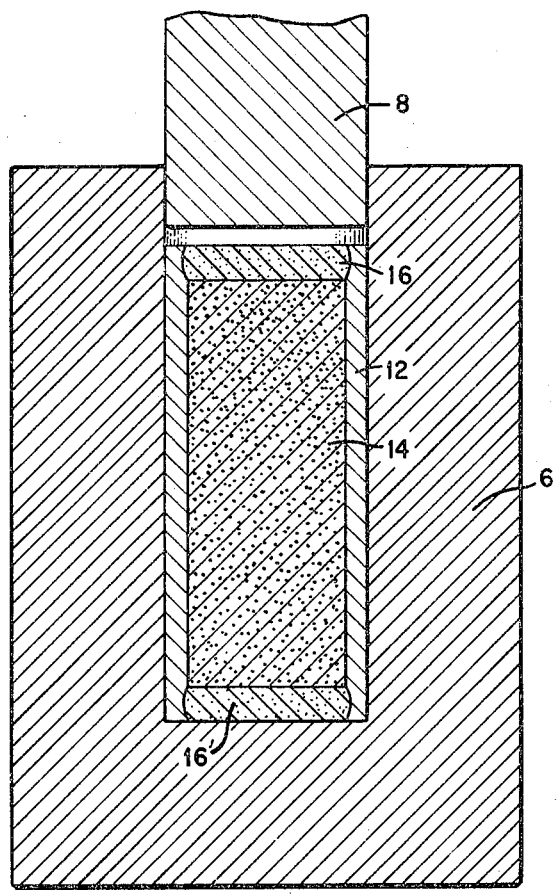
FIG. 4 is a vertical cross section view of a target pellet being formed in a die.

Referring next to FIG. 4, in fabricating the target pellet 10 a tubular metallic member 12 made of aluminum, stainless steel, zirconium or other metal compatible with the reactor environment, is disposed in a suitable die 6. A first metal powder, preferably of the same material as the tubular member 12 and sized to less than 100 mesh (U.S. Sieve Series) is placed in the lower portion of the tubular member to form a layer of sufficient thickness to yield, upon pressing, one end closure 16.

A second metal powder mixture 14 comprising a blend of an actinide oxide powder and a metal powder dispersant, preferably of the same material as the tubular member 12 is introduced into the tubular member on top of the first metal powder. Both the actinide oxide powder and the metal powder dispersant should be approximately the same particle size (between about −100 mesh and −325 mesh) to prevent segregation upon blending and are preferably sized to −325 mesh to provide maximum surface area. The ratio of actinide oxide powder to dispersant powder is not critical and depends on the reactor used for irradiation and the fission rate to be used. For target pellets for use in a reactor of the type described in the above-mentioned Cheverton application, the actinide oxide powder may vary from about 25% by volume to about 40% by volume. Isotopes of plutonium, americium, and curium in the form of oxides are the actinides preferred in this method.

A third metal powder of the same material used in the first metal powder, preferably the same material as the metallic tubular member 12, and sized to less than 100 mesh is charged in the upper portion of the tubular member on top of the second metal powder mixture. This third powder should form a layer of sufficient thickness to yield, upon pressing, another end closure 16'.

Tubular metallic member 12 containing the three metal powder layers is then cold-pressed by forcing ram 8 against the powder mass disposed within the cavity of die 6, at a pressure sufficient for the powder to reach a density of approximately 89% of theoretical density to form a target pellet 10. At this density the end closures 16, 16' have sufficient integrity to retain solid fission products and are sufficiently porous to allow fission gases to escape upon irradiation of the pellets.

The following example will further illustrate the method of our invention.

Example

Aluminum tubing, 0.25 inch outside diameter and having 0.015 inch wall thickness, was cut into a 1.1 inch length. In a dry box, the length of aluminum tubing was placed axially in a suitable die. Sufficient aluminum metal powder (−100 mesh) was placed in the lower portion of the tubing to result in a pressed porous end closure 0.025 inch thick. Plutonium oxide (25% by volume, −325 mesh) and aluminum metal powder (75% by volume, −325 mesh) were mixed in a mechanical blender and introduced into the aluminum tubing. The plutonium oxide-aluminum powder mix was covered with enough aluminum metal powder (−100 mesh) to result in a pressed porous end closure 0.025 inch thick. The tubing containing the powder was cold pressed at a pressure of 30 tons per square inch until the tubing length was reduced to 0.571 inch. The powders reached a density of about 89% of theoretical density which was found to provide sufficient integrity in the end closures, while at the same time sufficient porosity to allow gases to flow through the pellet.

The above example is merely illustrative and is not to be construed as limiting in any way the scope of our invention.

Figure 2:
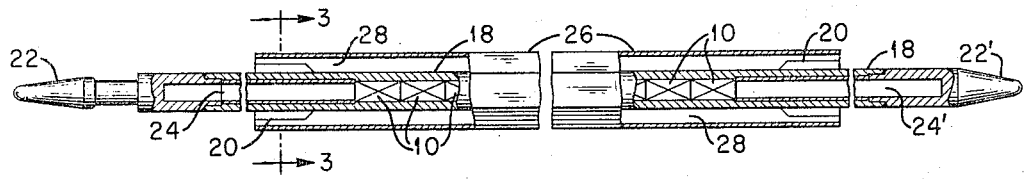
FIG. 2 is a side elevation, partly in transverse section, illustrating a nuclear reactor target rod with target pellets disposed therein.
Figure 3:
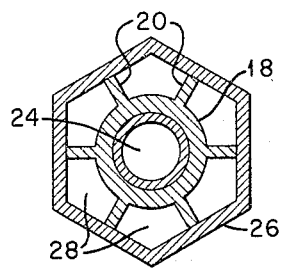
FIG. 3 is an enlarged section taken along line 3—3 of FIG. 2.

Referring now to FIG. 2 and FIG. 3, target pellets fabricated by the method of our invention are disposed for irradiation in a hermetically sealed target rod, an embodiment of which is shown in FIG. 2 and FIG. 3. The target rod consists of a hollow metal cylinder 18 fabricated from a metal compatible with the reactor environment, such as aluminum, stainless steel, or zirconium. The hollow metal cylinder 18 is provided with a plurality of metal fins 20 arranged at intervals along the metal cylinder 18 which serve as a means of support for the cylinder 18. The hollow metal cylinder 18 also has metal end caps 22, 22' which are welded to the ends of the hollow metal cylinder 18 to provide a hermetic seal to prevent the escape of fission gases.

In the fabrication of the target rod, a plurality of target pellets 10 are placed in the hollow metal cylinder 18 leaving void spaces 24, 24' at each end for the accumulation of fission gases. End caps 22, 22' are welded in place and the cylinder 18 is hydrostatically collapsed around the pellets 10 to improve the heat transfer characteristics of the rod. The resulting assembly is then placed and supported by metal fins 20 in a hexagonal support tube 26 referred to in the art as a "hex can" and which has a common longitudinal axis with hollow metal cylinder 18.

As will be noted in FIG. 3 there is a generally annular region 28 between the cylinder 18 and the support tube 26 to permit reaction coolant to flow through the target rod in this annular region 28.

In operation, the target rod containing the target pellets is disposed in the fuel region of a nuclear reactor for irradiation of the actinide elements to produce isotopes of various transuranium elements. A complete description of the type of fuel region and high flux reactor utilizing our invention is disclosed in the above-mentioned Cheverton application and in numerous technical publications.

It is to be understood that variations in apparatus and procedure may be employed by one skilled in the art without departing from the scope of our invention and that our invention is limited only as indicated by the appended claims.

What is claimed is:
1. The method of fabricating a nuclear reactor target pellet which comprises placing a tubular metallic member in a suitable die, charging the lower portion of said tubular member with a first metal powder, introducing a second metal powder mixture containing an actinide oxide, within said container, on top of said first metal powder, charging the upper portion of said tubular member with a third metal powder, on top of said second metal powder mixture, and as a sole metal-consolidation step simultaneously cold-pressing said metal powders to form a composite porous metal pellet, the ends of said pellet forming porous metallic end closures for the upper and lower portions of said tubular metallic member.

2. The method of claim 1 wherein said second metal powder mixture contains at least one actinide oxide selected from the group consisting of plutonium oxide, americium oxide, and curium oxide.

3. The method of claim 1 wherein said first and third metal powder consists of a metal selected from the group consisting of aluminum, stainless steel, and zirconium.

References Cited

UNITED STATES PATENTS

| | | | |
|---|---|---|---|
| 2,849,389 | 8/1958 | Brugmann | 176—79 |
| 2,858,262 | 10/1958 | Plott | 176—79 |
| 2,975,113 | 3/1961 | Gordon | 176—15 |
| 3,011,960 | 12/1961 | Williams et al. | 264—21 |
| 3,087,876 | 4/1963 | Henderson et al. | 264—21 |
| 3,087,879 | 4/1963 | Walker et al. | 176—79 |
| 3,285,714 | 11/1966 | Davies et al. | 75—208 |

L. DEWAYNE RUTLEDGE, *Primary Examiner.*

CARL D. QUARFORTH, *Examiner.*

R. C. LYNE, *Assistant Examiner.*